US009343727B2

(12) United States Patent
Okuda et al.

(10) Patent No.: US 9,343,727 B2
(45) Date of Patent: May 17, 2016

(54) ELECTRICITY STORAGE DEVICE

(71) Applicant: KABUSHIKI KAISHA TOYOTA JIDOSHOKKI, Kariya-shi, Aichi-ken (JP)

(72) Inventors: Motoaki Okuda, Kariya (JP); Atsushi Minagata, Kariya (JP)

(73) Assignee: KABUSHIKI KAISHA TOYOTA JIDOSHOKKI, Aichi-ken (JP)

(*) Notice: Subject to any disclaimer, the term of this patent is extended or adjusted under 35 U.S.C. 154(b) by 0 days.

(21) Appl. No.: 14/420,563

(22) PCT Filed: Aug. 9, 2013

(86) PCT No.: PCT/JP2013/071629
§ 371 (c)(1),
(2) Date: Feb. 9, 2015

(87) PCT Pub. No.: WO2014/034413
PCT Pub. Date: Mar. 6, 2014

(65) Prior Publication Data
US 2015/0236329 A1 Aug. 20, 2015

(30) Foreign Application Priority Data
Aug. 28, 2012 (JP) ................................. 2012-187899

(51) Int. Cl.
*H01M 2/04* (2006.01)
*H01M 2/26* (2006.01)
*H01M 10/04* (2006.01)
*H01M 10/0585* (2010.01)
*H01M 10/0525* (2010.01)
*H01M 10/6553* (2014.01)

(52) U.S. Cl.
CPC .......... *H01M 2/266* (2013.01); *H01M 10/0413* (2013.01); *H01M 10/0585* (2013.01); *H01M 10/0525* (2013.01); *H01M 10/6553* (2015.04)

(58) Field of Classification Search
CPC ..................... H01M 10/0413; H01M 10/0525; H01M 10/0585; H01M 2/266; H01M 10/6553
See application file for complete search history.

(56) References Cited

U.S. PATENT DOCUMENTS

2009/0017376 A1* 1/2009 Yamamura ............ H01M 2/266
429/209

FOREIGN PATENT DOCUMENTS

JP 2002-298825 A 10/2002
JP 2009-38004 A 2/2009
(Continued)

OTHER PUBLICATIONS

International Preliminary Report on Patentability and Written Opinion dated Mar. 3, 2015, issued by the International Bureau of WIPO in counterpart International application No. PCT/JP2013/071629.

*Primary Examiner* — Patrick Ryan
*Assistant Examiner* — Ben Lewis
(74) *Attorney, Agent, or Firm* — Sughrue Mion, PLLC

(57) ABSTRACT

An electricity storage device includes an electrode assembly such that positive and negative electrodes are alternately stacked in which the positive and negative electrodes are insulated from one another. Tab groups each including positive or negative electrode tabs bundled in the stacking direction of the electrode assembly are provided on an edge portion of the electrode assembly. The tab groups each include a first bent portion and an extending portion, which extends from the first bent portion in the stacking direction of the electrode assembly. The tab groups also each include a second bent portion at which the tab group is curved or bent such that the distal end in the extending direction of the tab that is located at an outermost position of the first bent portion is positioned between the electrode assembly and the tab that is located at an innermost position of the first bent portion.

6 Claims, 6 Drawing Sheets

(56) References Cited

FOREIGN PATENT DOCUMENTS

| | | |
|---|---|---|
| JP | 2009/146601 A | 7/2009 |
| JP | 2009/187768 A | 8/2009 |
| JP | 2011-171303 A | 9/2011 |
| WO | 2010/030606 A2 | 3/2010 |

* cited by examiner

ELECTRICITY STORAGE DEVICE

CROSS REFERENCE TO RELATED APPLICATIONS

This application is a National Stage of International Application No. PCT/JP2013/071629 filed Aug. 9, 2013, claiming priority based on Japanese Patent Application No. 2012-187899 filed Aug. 28, 2012, the contents of all of which are incorporated herein by reference in their entirety.

FIELD OF THE INVENTION

The present invention relates to an electricity storage device that includes an electrode assembly.

BACKGROUND OF THE INVENTION

A rechargeable battery such as a lithium ion battery as an electricity storage device that stores power supplied to an electric motor used as a drive source is mounted on a vehicle such as an electric vehicle (EV) and a plug-in hybrid vehicle (PHV).

Patent Document 1 discloses such a type of the rechargeable battery, for example. As shown in FIG. 9, a rechargeable battery 50 of Patent Document 1 is configured such that a case 51 accommodates an electrode assembly 52 and terminal members 53 are connected to the electrode assembly 52. The electrode assembly 52 includes negative electrodes 54, in each of which negative electrode active material layers 54b are applied to a metal foil 54a, and positive electrodes 55, in each of which positive electrode active material layers 55b are applied to a metal foil 55a. The electrode assembly 52 is configured to be stacked such that a separator 56 is located between each adjacent pair of the negative electrodes 54 and the positive electrodes 55. In the electricity storage device including the rechargeable battery 50 as in Patent Document 1, a tab, which is a region free from the active material, is formed on each of the metal foil 54a of each negative electrode 54 and the metal foil 55a of each positive electrode 55. The tabs are bundled as tab groups and connected to the terminal members 53. The tab groups each include a bent portion, which is curved or bent, and an extending portion, which extends from the bent portion in the stacking direction of the electrode assembly 52. The extending portion contacts and is connected to the corresponding terminal member 53.

PRIOR ART DOCUMENT

Patent Document

Patent Document 1: Japanese Laid-Open Patent Publication No. 2002-298825

SUMMARY OF THE INVENTION

The tab groups are welded to the corresponding terminal members 53. When the tab groups and the corresponding terminal members 53 are joined to each other by welding, the size of the area of the joined portion is reflected in the current collection efficiency in the terminal members 53.

Accordingly, it is desirable that the area of the joined portions between the tab groups and the corresponding terminal members 53 be greater. To enlarge the area of the joined portions between the tab groups and the corresponding terminal members 53, it is necessary to extend the lengths of the tabs to enlarge the area in which all the tabs are stacked.

However, if the lengths of the tabs are extended as described above, the tip ends of the tabs may contact the inner surface of the case 51 or an electrode having a different polarity in the electrode assembly. The contact between the tip ends of the tabs and the inner surface of the case 51 or the electrode having a different polarity causes a short-circuit between the tabs and the case 51 or between the tabs and the electrodes.

An objective of the present invention is to provide an electricity storage device that prevents a short-circuit from occurring between tabs and a case or between tabs and electrodes.

In order to achieve the above described objective, an electricity storage device includes: one or more positive electrodes each having an edge portion and a tab on the edge portion; one or more negative electrodes each having an edge portion and a tab on the edge portion; an electrode assembly configured such that the positive electrodes and the negative electrodes are alternately stacked in a state in which the positive electrodes and the negative electrodes are insulated from each other; an electrode terminal; a conductive member; tab groups each including tabs of the positive electrodes or tabs of the negative electrodes bundled in a stacking direction of the electrode assembly; and a case, which accommodates the conductive member and the electrode assembly. The electrode terminal transfers electricity between the electrode terminal and the electrode assembly. The conductive member electrically connects the electrode assembly and the electrode terminal. The tab groups are provided on an edge portion of the electrode assembly and connected to the conductive member. The tab groups each include a first bent portion, which is curved or bent, and an extending portion, which extends from the first bent portion in the stacking direction of the electrode assembly. Each extending portion includes a connecting portion electrically connected to the conductive member. The tab groups each include a second bent portion at which the tab group is curved or bent such that a distal end in the extending direction of the tab that is located at an outermost position of the first bent portion is positioned between the electrode assembly and the tab that is located at an innermost position of the first bent portion.

DETAILED DESCRIPTION OF THE PREFERRED EMBODIMENTS

Hereinafter, one embodiment will be described according to FIGS. 1 to 6.

Figure 1:
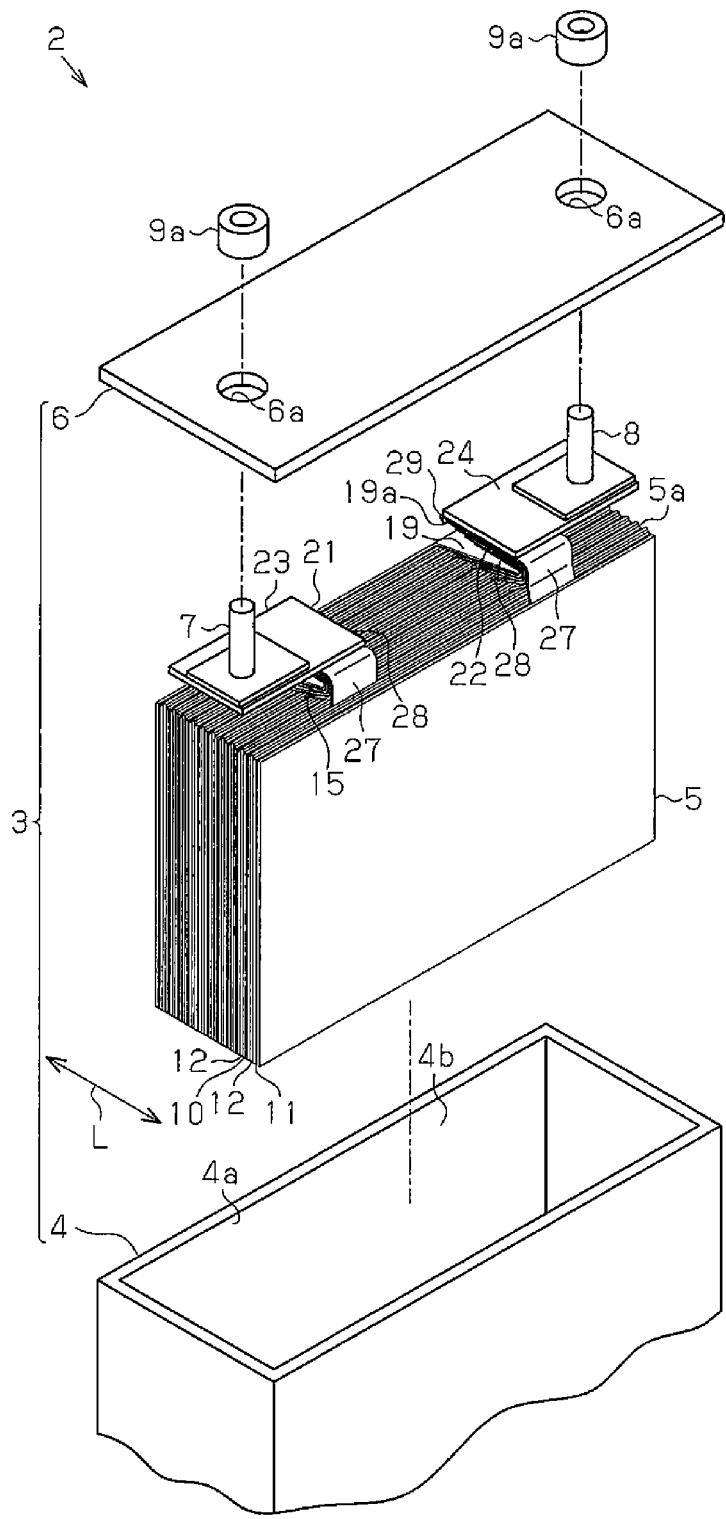
FIG. 1 is an exploded perspective view of a rechargeable battery according to one embodiment.
Figure 2:
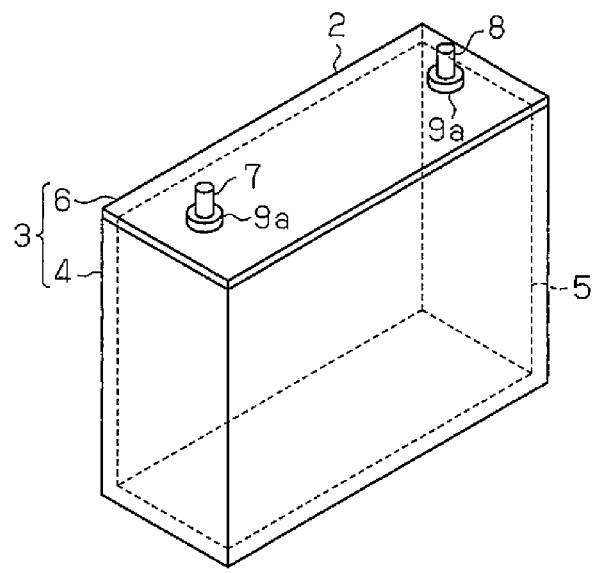
FIG. 2 is a perspective view illustrating an appearance of the rechargeable battery.

As shown in FIGS. 1 and 2, in a rechargeable battery 2 as an electricity storage device, a case 3 accommodates an electrode assembly 5. The case 3 includes a box-like body member 4 and a rectangular plate-like lid member 6, which closes the opening 4a of the body member 4. The body member 4 and the lid member 6 are made of metal (e.g., stainless steel and aluminum). The rechargeable battery 2 according to the present embodiment is a rectangular-shaped battery that has a rectangular-shaped outline. The rechargeable battery 2 according to the present embodiment is a lithium ion battery.

The electrode terminals including a positive electrode terminal 7 and a negative electrode terminal 8, which transfer electricity between each electrode terminal and the electrode assembly 5, are electrically connected to the electrode assembly 5. The positive electrode terminal 7 and the negative electrode terminal 8 are exposed to the outside of the case 3 through two opening holes 6a formed in the lid member 6 at a predetermined distance. Ring-shaped insulating members 9a for insulating the positive electrode terminal 7 and the negative electrode terminal 8 from the case 3 are attached to the positive electrode terminal 7 and the negative electrode terminal 8.

Figure 3:
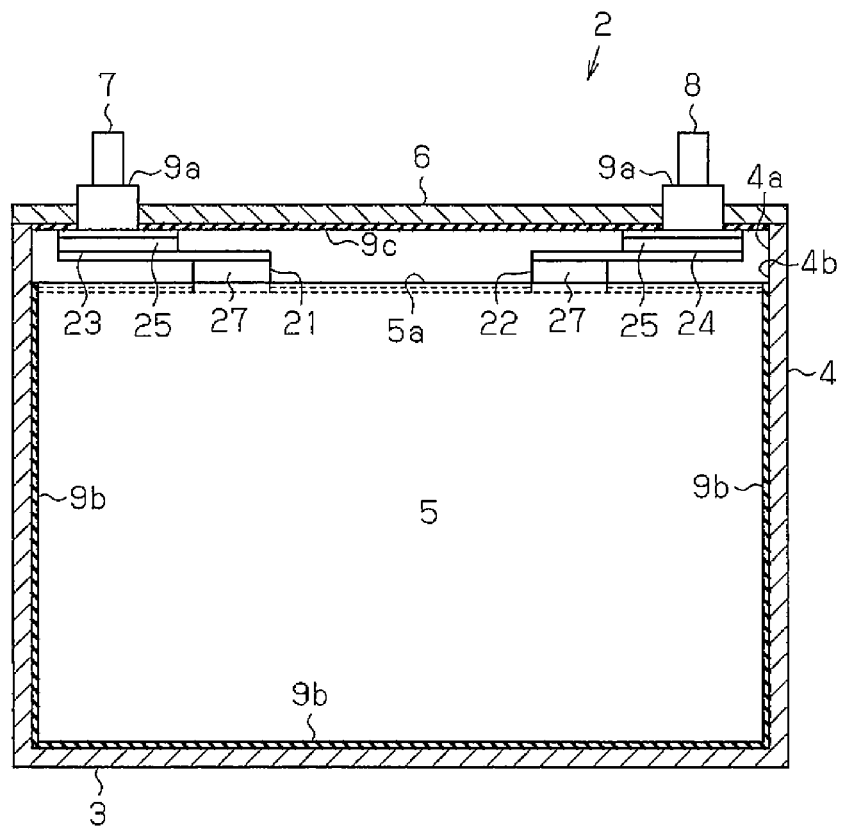
FIG. 3 is a cross-sectional view illustrating an electrode assembly inserted into a case.

As shown in FIG. 3, an insulating sheet 9b for insulating the body member 4, which configures the case 3, and the electrode assembly 5 accommodated in the case 3 from each other is applied on the inner surface 4b of the body member 4. An insulating sheet 9c for insulating the lid member 6, which configures the case 3, and the electrode assembly 5 accommodated in the case 3 from each other is applied on the inner surface of the lid member 6.

Figure 4:
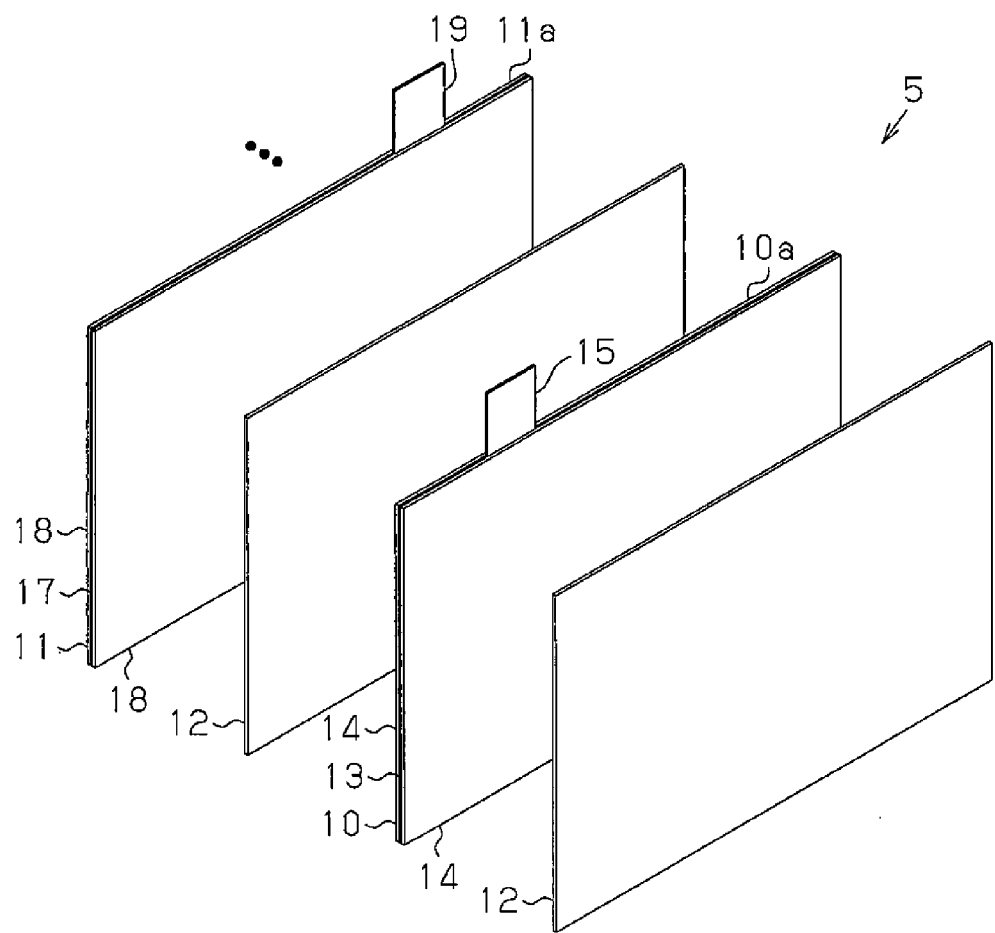
FIG. 4 is an exploded perspective view illustrating components of the electrode assembly.
Figure 5:
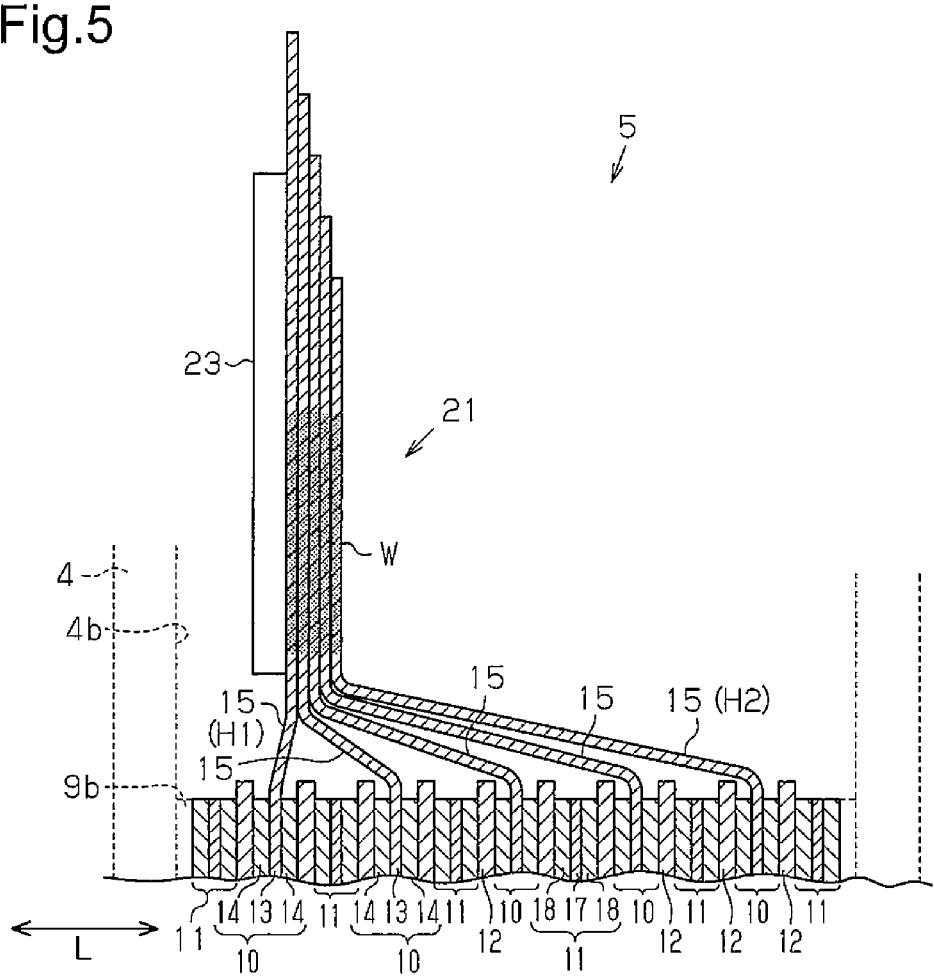
FIG. 5 is an explanatory view illustrating a tab group to which a conductive member is connected.

As shown in FIG. 4, the electrode assembly 5 includes sheet-like positive electrodes 10 and sheet-like negative electrodes 11. Each positive electrode 10 includes a positive electrode metal foil (in the present embodiment, aluminum foil) 13 and positive electrode active material layers 14. Each positive electrode active material layer 14 includes surfaces on which a positive electrode active material is applied. Each negative electrode 11 includes a negative electrode metal foil (in the present embodiment, copper foil) 17 and negative electrode active material layers 18. Each negative electrode active material layer 18 includes surfaces on which a negative electrode active material is applied. The electrode assembly 5 has a stacked structure in which a separator 12 is located between each adjacent pair of the positive electrodes 10 and the negative electrodes 11. Each separator 12 insulates the corresponding pair of the positive electrode 10 and the negative electrode 11 from each other. As shown in FIG. 5, for example, the electrode assembly 5 is configured such that a plurality of the positive electrodes 10 and a plurality of the negative electrodes 11 are stacked. That is, the electrode assembly 5 includes a plurality of sets each including a positive electrode 10, a negative electrode 11, and a separator 12. When the case 3 accommodates the electrode assembly 5, on the inner surface 4b of the body member 4, the insulating sheet 9b is provided in the range in which the positive electrode active material layers 14 and the negative electrode active material layers 18 are located.

As shown in FIG. 4, each positive electrode 10 includes a positive electrode non-application portion, in which the positive electrode active material is not applied to the positive electrode metal foil 13. A part of the edge portion 10a of each positive electrode 10 includes a positive electrode tab 15 configured by the positive electrode non-application portion, which is shaped to protrude from the edge portion 10a. Each negative electrode 11 includes a negative electrode non-application portion in which the negative electrode active material is not applied to the negative electrode metal foil 17. A part of the edge portion 11a of each negative electrode 11 includes a negative electrode tab 19 configured by the negative electrode non-application portion, which is shaped to protrude from the edge portion 11a. The positive electrode tabs 15 and the negative electrode tabs 19 are provided at positions in which the positive electrode tabs 15 and the negative electrode tabs 19 are not stacked in the state in which the positive electrodes 10 and the negative electrodes 11 are stacked.

The positive electrodes 10, which configure the electrode assembly 5, are stacked such that the positive electrode tabs 15 are aligned in the stacking direction L. The negative electrodes 11, which configure the electrode assembly 5, are stacked such that the negative electrode tabs 19 are aligned in the stacking direction L in the same manner. As shown in FIG. 1, a positive electrode tab group 21, in which all the positive electrode tabs 15 in the electrode assembly 5 are bundled in the stacking direction L, is provided on the edge portion 5a of the electrode assembly 5. That is, the positive electrode tabs 15 from the positive electrode tab 15 located at the outermost position on one side in the stacking direction L to the positive electrode tab 15 located at the outermost position on the other side in the stacking direction L are bundled. A negative electrode tab group 22, in which all the negative electrode tabs 19 in the electrode assembly 5 are bundled in the stacking direction L, is provided on the edge portion 5a of the electrode assembly 5 in the same manner. That is, the negative electrode tabs 19 from the negative electrode tab 19 located at the outermost position on one side in the stacking direction L to the negative electrode tab 19 located at the outermost position on the other side in the stacking direction L are bundled.

A positive electrode conductive member 23 for electrically connecting the electrode assembly 5 and the positive electrode terminal 7 is joined to the positive electrode tab group 21. A negative electrode conductive member 24 for electrically connecting the electrode assembly 5 and the negative electrode terminal 8 is joined to the negative electrode tab group 22. As shown in FIG. 3, the positive electrode terminal 7 and the positive electrode tab group 21 are electrically connected to each other through an overcurrent protection circuit 25. The negative electrode terminal 8 and the negative electrode tab group 22 are also electrically connected to each other through the overcurrent protection circuit 25 in the same manner.

As shown in FIG. 1, the positive electrode conductive member 23 and the negative electrode conductive member 24 are rectangular plate-like. The lengths of the positive electrode conductive member 23 and the negative electrode conductive member 24 in the transverse direction are set less than the length of the electrode assembly 5 in the stacking direction L. The lengths of the positive electrode conductive member 23 and the negative electrode conductive member 24 in the longitudinal direction are set such that the positive electrode conductive member 23 and the negative electrode conductive member 24 do not interfere with other members when the positive electrode conductive member 23 and the negative electrode conductive member 24 are joined to the corresponding positive electrode tab group 21 and the negative electrode tab group 22. In the case of the present embodiment, the positive electrode conductive member 23 and the negative electrode conductive member 24 are shaped to protrude in the direction that is perpendicular to the stacking direction L of the electrode assembly 5 when the positive electrode conductive member 23 and the negative electrode conductive member 24 are joined to the corresponding positive electrode tab group 21 and the negative electrode tab group 22. Specifically, the positive electrode conductive member 23 and the negative electrode conductive member 24 are shaped to protrude toward the inner surface 4b of the body member 4 of the case 3. Accordingly, the lengths of the positive electrode conductive member 23 and the negative electrode conductive member 24 are set such that the positive electrode conductive member 23 and the negative electrode conductive member 24 do not interfere with the inner surface 4b of the body member 4 when the positive electrode conductive member 23 and the negative electrode conductive member 24 are joined to the corresponding positive electrode tab group 21 and the negative electrode tab group 22.

Figure 6:
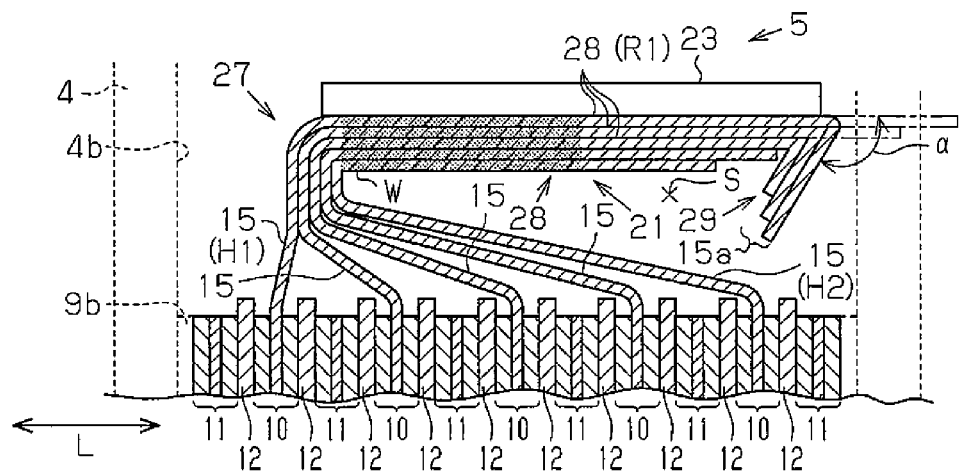
FIG. 6 is an explanatory view illustrating the tab group, which is bent.

Next, the joint structures between the positive electrode tab group 21 and the positive electrode conductive member 23 and between the negative electrode tab group 22 and the negative electrode conductive member 24 will be described in details according to FIGS. 5 and 6. FIGS. 5 and 6 show the joint structure between the positive electrode tab group 21 and the positive electrode conductive member 23. This joint structure is the same as the joint structure between the negative electrode tab group 22 and the negative electrode conductive member 24. Accordingly, hereinafter, the joint structure between the positive electrode tab group 21 and the positive electrode conductive member 23 will be described. In the following description, the joint structure between the negative electrode tab group 22 and the negative electrode conductive member 24 will be also given if the positive electrode tabs 15 are replaced by the negative electrode tabs 19, the distal ends 15a of the positive electrode tabs 15 are replaced by the distal ends 19a of the negative electrode tabs 19, the positive electrode tab group 21 is replaced by the negative electrode tab group 22, and the positive electrode conductive member 23 is replaced by the negative electrode conductive member 24.

As shown in FIG. 5, in the positive electrode tab group 21, the positive electrode tab 15 that is located at the outermost position on one side is referenced as "H1", and the positive electrode tab 15 that is located at the outermost position on the other side is referenced as "H2". The positive electrode tabs 15 are bundled such that the positive electrode tab 15(H2) approaches the positive electrode tab 15(H1). At this time, in the present embodiment, the positive electrode conductive member 23 contacts the positive electrode tab 15(H1). Accordingly, the positive electrode tabs 15, which have been independent from each other at the stacking stage, are bundled toward the positive electrode tab 15 (H1) to configure the positive electrode tab group 21. The positive electrode tab group 21 and the positive electrode conductive member 23 are joined to each other by resistance welding to be electrically connected to each other as well. The resistance welding is a method for clamping and welding joint objects (the positive electrode tab group 21 and the positive electrode conductive member 23 in FIG. 5) by two welding electrodes.

In the present embodiment, the positive electrode tabs 15 have the same size. Accordingly, in the stacking direction L of the electrode assembly 5, the farther the positive electrode tabs 15 are located from the positive electrode tab 15(H1), the less the lengths of the positive electrode tabs 15 bundled as the positive electrode tab group 21 become. Accordingly, the welding portion W in all the positive electrode tabs 15 is formed to match the region of the positive electrode tab 15(H2) in which the positive electrode tab 15(H2) is stacked on the other positive electrode tabs 15. According to the present embodiment, the positive electrode tab group 21 and the positive electrode conductive member 23 are joined to each other by the welding portion W such that the positive electrode tab group 21 and the positive electrode conductive member 23 are electrically connected to each other.

As shown in FIG. 6, the positive electrode tab group 21 includes a first bent portion 27, which is curved, and extending portions 28, which extend from the first bent portion 27 in the stacking direction L of the electrode assembly 5. The configuration of the positive electrode tab group 21 is formed by turning the positive electrode tab group 21 and the positive electrode conductive member 23 to the right in the stacking direction L of the electrode assembly 5 to bend the positive electrode tab group 21. Of the positive electrode tab group 21, the welding portion W of the extending portion 28 of the positive electrode tab 15(H1), which is located at the outermost position in the bending direction of the first bent portion 27, is a connecting portion to be connected to the positive electrode conductive member 23. The positive electrode conductive member 23 after bending the positive electrode tab group 21 is located outside the extending portions 28 in the positive electrode tab group 21. The distal ends 15a may protrude from the end of the positive electrode conductive member 23 in the extending direction of the extending portions 28 depending on the lengths of the extending portions 28. The protruding distal ends 15a may contact the inner surface 4b of the case 3 when the case 3 accommodates the electrode assembly 5. The present embodiment shows an example in which the lengths of the extending portions 28 of the three positive electrode tabs 15 including the positive electrode tab 15(H1) of the positive electrode tab group 21, which are located at the outer positions in the bending direction of the first bent portion 27, are set such that the extending portions 28 contact the inner surface 4b of the case 3.

Of the extending portions 28, ones in which the distal ends 15a protrude from the end of the positive electrode conductive member 23 in the extending direction of the extending portions 28 include a second bent portion 29 formed by bending the extending portions 28 at the distal ends 15a in the extending direction of the first bent portion 27. In the present embodiment, the extending portions 28 are bent at the second bent portion 29 in the same direction as the curving direction of the positive electrode tab group 21 at the first bent portion 27, i.e., in the right direction (clockwise direction) in FIG. 6. The extending portions 28 of three positive electrode tabs 15 including the positive electrode tab 15(H1) of the positive electrode tab group 21 that are located at the outer positions in the bending direction of the first bent portion 27 include the second bent portion 29. That is, the distal ends 15a of the three positive electrode tabs 15 include the second bent portion 29. In FIG. 6, a reference numeral "R1" is assigned to the three extending portions 28 that include the second bent portion 29. The extending portions 28(R1) are bent at the second bent portion 29 before the extending portions 28(R1) contact the inner surface 4b of the body member 4 of the case 3. The extending portions (R1) are bent at the second bent portion 29 by a predetermined angle α. The predetermined angle α is defined by the distal end 15a of the extending portion 28 of the positive electrode tab 15(H1) shown by the alternate long and short dash line in which the second bent portion 29 is not formed and the distal end 15a shown by the solid line in which the second bent portion 29 is formed in FIG. 6. The angle α is obtuse. According to the second bent portion 29, the distal ends 15a in the extending direction of the extending portions 28(R1) extend in the direction approaching the electrode assembly 5. The distal ends 15a of the extending portions 28(R1) are located between the electrode assembly 5 and the positive electrode tab 15(H2), which is located at the innermost position in the first bent portion 27. That is, the distal ends 15a of the extending portions 28(R1) are located in the space S defined by the electrode assembly 5 and the positive electrode tab group 21 inward from the first bent portion 27.

The space S includes a region from the edge portion 10a of the positive electrode 10 in each positive electrode tab 15 to the first bent portion 27 of the positive electrode tab group 21. The space S is defined by the positive electrode tab group 21, the electrode assembly 5, and the region of the positive electrode tabs 15 located between the positive electrode tab group 21 and the electrode assembly 5. The distal ends 15a of all the extending portions 28(R1) are located between the electrode assembly 5 and the positive electrode tab 15(H2), i.e., in the space S so that the distal ends 15a do not contact any of the electrode assembly 5, the tab groups 21 and 22, and the inner surface 4b of the case 3.

Hereinafter, operations of the rechargeable battery 2 according to the present embodiment will be described.

If the lengths of the extending portions 28 of the positive electrode tab group 21 or the negative electrode tab group 22 are extended to ensure a sufficient contact area between the extending portions 28 and the corresponding one of the conductive members 23 and 24, the distal ends 15a or 19a of the extending portions (R1) may contact the inner surface 4b of the case 3. Even in this case, the distal ends 15a or 19a of the extending portion 28(R1) are located at positions separated from the inner surface 4b of the body member 4. This prevents the contact between the distal ends 15a and the inner surface 4b of the case 3.

The distal end 15a or 19a of the extending portion 28(R1) of the positive electrode tab 15(H1) or the negative electrode tab 19(H1) may contact an electrode having a polarity that is different from the polarity of the positive electrode tab 15(H1) or the negative electrode tab 19(H1), e.g., the negative electrode 11 or the positive electrode 10, which is located at the rightmost position in the stacking direction L of the electrode assembly 5 in FIG. 6 depending on the length of the extending portion 28. According to the present embodiment, the distal ends 15a or 19a of the extending portions 28(R1) are located between the electrode assembly 5 and the positive electrode tab 15(H2), i.e., in the space S. This prevents the contact between the distal ends 15a and an electrode having a different polarity or between the distal ends 19a and an electrode having a different polarity.

As described above, the present embodiment has the following advantages.

(1) A simple structure, in which the second bent portion 29 is formed in the extending portions 28(R1) of the positive electrode tab group 21 and the negative electrode tab group 22, prevents a short-circuit between the positive electrode tabs 15 and the case 3 or between the positive electrode tabs 15 and the negative electrodes 11, or a short-circuit between the negative electrode tabs 19 and the case 3 or between the negative electrode tabs 19 and the positive electrodes 10 from occurring.

The length of the extending portion 28 of the positive electrode tab 15(H1) or the negative electrode tab 19(H1) of the tab group 21 or 22, which is located at the outermost position in the bending direction of the first bent portion 27, is the longest among the extending portions 28 of the positive electrode tab group 21 or the negative electrode tab group 22. Accordingly, the second bent portion 29 as configured above is formed in the extending portion 28 of the positive electrode tab 15(H1) or the negative electrode tab 19(H1). This prevents a short-circuit between the positive electrode tabs 15 and the case 3 or between the positive electrode tabs 15 and the electrodes 11, or a short-circuit between the negative electrode tabs 19 and the case 3 or between the negative electrode tabs 19 and the electrodes 10 from occurring.

(2) The extending portions 28(R1) are bent at the second bent portion 29 before the extending portions 28(R1) contact the inner surface 4b of the body member 4 of the case 3. That is, the extending portions 28(R1) have already been insulated from the case 3 at the second bent portion 29. Accordingly, even if the bending degree of the extending portions 28(R1) at the second bent portion 29 is small, the distal ends 15a or 19a positioned farther from the second bent portion 29 in the extending direction of the extending portions 28(R1) are located between the electrode assembly 5 and the positive electrode tab 15(H2), which is located at the innermost position at the first bent portion 27, or between the electrode assembly 5 and the negative electrode tab 19(H2), which is located at the innermost position at the first bent portion 27. That is, the distal ends 15a or 19a are located in the space S defined by the electrode assembly 5 and the positive electrode tab group 21 inward from the first bent portion 27. This more easily prevents a short-circuit between the positive electrode tabs 15 and the case 3 or between the positive electrode tabs 15 and the electrodes 11, or a short-circuit between the negative electrode tabs 19 and the case 3 or between the negative electrode tabs 19 and the electrodes 10 from occurring.

(3) A region occupied by the tab group 21 or 22 such as the first bent portion 27, the extending portions 28, and the second bent portion 29 is reduced in the case 3.

(4) The second bent portion 29 is formed in the extending portions 28(R1). This prevents a short-circuit from occurring while extending the lengths of the extending portions 28 to increase the joint area between the conductive member 23 or 24 and the corresponding positive electrode tab group 21 or the negative electrode tab group 22. This improves the current collection efficiency of the conductive members 23 and 24.

(5) According to the second bent portion 29, the distal ends 15a or 19a of the extending portions 28(R1) are located between the electrode assembly 5 and the positive electrode tab 15(H2) or between the electrode assembly 5 and the negative electrode tab 19(H2), i.e., in the space S. The portion between the electrode assembly 5 and the positive electrode tab 15(H2) or between the electrode assembly 5 and the negative electrode tab 19(H2), i.e., the space S is a dead space generated when the positive electrode tab group 21 or the negative electrode tab group 22 includes the first bent portion 27 and the extending portions 28. According to the present embodiment, such a dead space is efficiently used for bending and locating the distal ends 15a or 19a.

The above embodiment may be modified as necessary in the follow manners.

Figure 7:
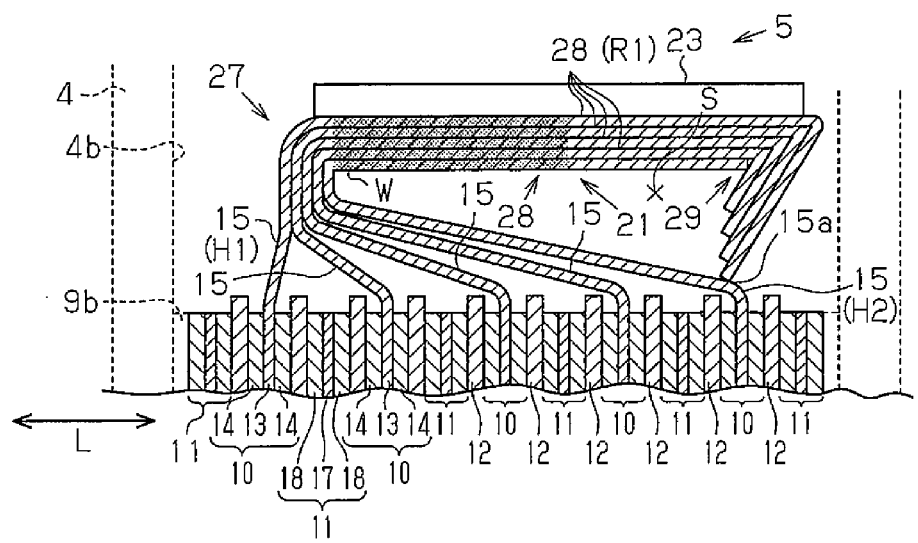
FIG. 7 is an explanatory view illustrating a bent tab group according to another embodiment.

According to the above embodiment, the distal ends 15a of the extending portions 28(R1) of the positive electrode tab group 21 are located at positions in which the distal ends 15a do not contact any of the electrode assembly 5, the tab groups 21 and 22 and the inner surface 4b of the case 3. The distal ends 15a of the extending portions 28(R1) may contact the positive electrodes 10 that are electrodes having the same polarity as the polarity of the positive electrode tabs 15 including the extending portions 28(R1). Specifically, as shown in FIG. 7, the extending portions 28(R1) are bent at the second bent portion 29 before the extending portions 28(R1) contact the inner surface 4b of the body member 4 of the case 3. FIG. 7 shows an example in which the lengths of the extending portions 28 of the four positive electrode tabs 15 including the positive electrode tab 15(H1) of the positive electrode tab group 21, which are located at the outer positions in the bending direction of the first bent portion 27, are set such that the extending portions 28 contact the inner surface 4b of the case 3. The extending portions 28(R1) of the four positive electrode tabs 15, which are located at the outer positions in the bending direction of the first bent portion 27, include the second bent portion 29. That is, the distal ends 15a of the four positive electrode tabs 15 include the second bent portion 29. The extending portions 28 are bent at the second bent portion 29. This brings the distal end 15a of the extending portion 28 of the positive electrode tab 15(H1) of the distal ends 15a of the extending portions 28(R1) into contact with the positive electrode tab 15(H2). The contact between the distal end 15a of the extending portion 28 and the positive electrode tab 15(H2) corresponds to a state in which the surface of the distal end 15a and the surface of the positive electrode tab 15(H2) only contact each other. In contrast, the extending portions 28 of the positive electrode tabs 15 other than the positive electrode tab 15(H1) of the extending portions 28(R1) are also bent at the second bent portion 29. This locates the distal ends 15a of the extending portions 28 between the electrode assembly 5 and the positive electrode tab 15(H2), i.e., in the space S. Such a modification more easily configure the positive electrode tab group 21 such that the distal ends 15a of the electrode tabs 15 do not contact the inner surface 4b of the case 3. Further, since the distal ends 15a of the extending portions 28 and the positive electrode tab 15(H2) that the distal ends 15a contact have the same polarity, such a form of contact prevents a short-circuit between the electrodes having different polarities from occurring. The form of the negative electrodes 11 illustrated in FIG. 7 may be employed in place of the positive electrodes 10.

In the form shown in FIG. 7, the contact between the distal end 15a of the extending portion 28 and the positive electrode tab 15(H2) corresponds to a state in which the surface of the distal end 15a and the surface of the positive electrode tab 15(H2) only contact each other. Alternatively, the contact may correspond to a state in which the distal end 15a and the positive electrode tab 15(H2) are joined by welding or adhering, for example. Such a form ensures the form of the positive electrode tab group 21 in which the distal ends of the positive electrode tabs 15 do not contact the inner surface 4b of the case 3 in a stable manner. In the present form, the negative electrodes 11 may be employed in place of the positive electrodes 10.

In the form shown in FIG. 7, only the distal end 15a of the positive electrode tab 15(H1) is brought into contact with the positive electrode tab 15(H2). The distal ends 15a of the extending portions 28 of the positive electrode tabs 15 other than the positive electrode tab 15(H1) may contact the positive electrode tab 15(H2) in the same manner depending on the lengths of the extending portions 28. In the present form, the negative electrodes 11 may be employed in place of the positive electrodes 10.

In the form shown in FIG. 7, the distal end 15a of the extending portion 28 is brought into contact with the positive electrode tab 15(H2). Alternatively, the distal end 15a may be brought into contact with the positive electrode tabs 15 other than the positive electrode tab (H2). Further, the distal end 15a may be brought into contact with the positive electrode active material layers 14 of the positive electrodes 10 or the separators 12. Moreover, as for the positive electrodes 10, positive electrodes 10 may be employed in each of which a region in the vicinity of the edge portion 10a shaped such that the positive electrode tab 15 protrudes is configured by a positive electrode non-application portion in which the positive electrode active material is not applied to the positive electrode metal foil 13. Accordingly, the distal end 15a may be brought into contact with the positive electrode application portion. In the present form, the negative electrodes 11 may be employed in place of the positive electrodes 10.

Figure 8:
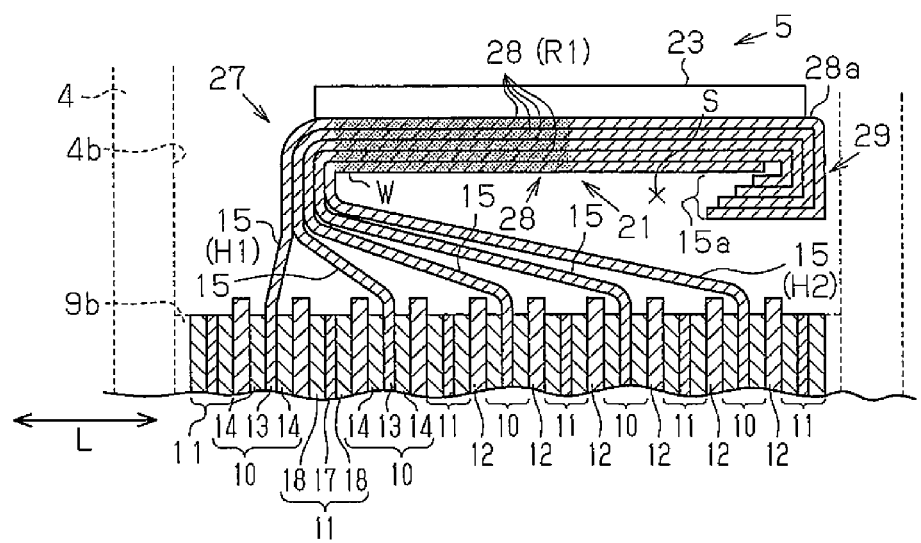
FIG. 8 is an explanatory view illustrating a bent tab group according to yet another embodiment.
Figure 9:
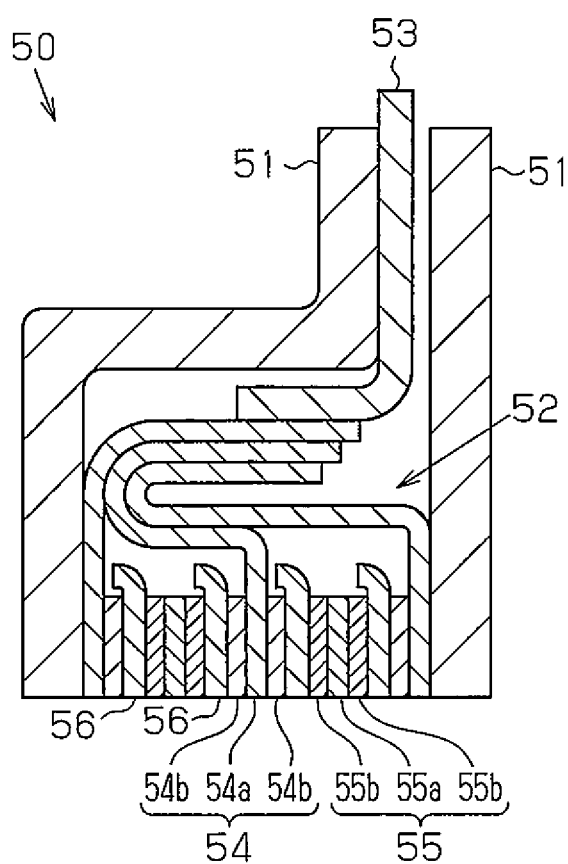
FIG. 9 is a cross-sectional view illustrating a way of a connection between a conventional tab group and a conductive member.

As shown in FIG. 8, the extending portions 28 may be bent at the second bent portion 29 such that the distal ends 15a are substantially in parallel with the extending portions 28a in the range from the first bent portion 27 to the second bent portion 29. FIG. 8 shows an example in which the lengths of the extending portions 28 of the four positive electrode tabs 15 including the positive electrode tab 15(H1) of the positive electrode tab group 21, which are located at the outer positions in the bending direction of the first bent portion 27, are set such that the extending portions 28 contact the inner surface 4b of the case 3. The extending portions 28(R1) of the four positive electrode tabs 15, which are located at the outer positions in the bending direction of the first bent portion 27, include the second bent portion 29. That is, the distal ends 15a of the four positive electrode tabs 15 include the second bent portion 29. Such a form easily sets a bending degree of the extending portions 28(R1) at the second bent portion 29. Further, the bending degree of the extending portions 28(R1) at the second bent portion 29 is increased. This ensures the form of the positive electrode tab group 21 in which the distal ends 15a of the positive electrode tabs 15 do not contact the inner surface 4b of the case 3 or electrodes having a different polarity in a stable manner. The present form includes a form in which the distal ends 15a are in parallels with the extending portions 28a in the range from the first bent portion 27 to the second bent portion 29. The form of the negative electrodes 11 illustrated in FIG. 8 may be employed in place of the positive electrodes 10.

The second bent portion 29 is insulated from the case 3 by bending the extending portions 28 at the second bent portion 29 before the inner surface 4b of the case 3. Insulating members such as the insulating sheet 9b are located between the second bent portion 29 and the case 3. This further ensures the prevention of a short-circuit from occurring between the tabs 15 and the inner surface 4b of the case 3 or between the tabs 19 and the inner surface 4b.

The extending portions 28 may be curved at the second bent portion 29.

The tab groups 21 and 22 may be bent at the first bent portion 27.

Any of the extending portions 28 are selected to have a second bent portion 29 depending on the lengths of the extending portions 28 of the tabs 15 or 19. However, the distal end 15a or 19a of the corresponding positive electrode tab 15(H1) or the negative electrode tab 19(H1) of the tab groups 21 or 22 in the extending direction, which is located at the outermost position in the bending direction at the first bent portion 27, includes the second bent portion 29. Further, the second bent portion 29 may be configured such that the distal ends 15a or 19a are located between the electrode assembly 5 and the corresponding positive electrode tab 15(H2) or between the electrode assembly 5 and the corresponding negative electrode tab 19(H2), i.e., in the space S, or the distal ends 15a or 19a contact an electrode having the same polarity.

As for the second bent portion 29, the extending portions 28 may be curved or bent in a direction that is different from the curving or bending direction at the first bent portion 27 in the positive electrode tab group 21 or the negative electrode tab group 22, i.e., the left (counterclockwise) direction in FIGS. 6 to 8, for example.

According to the above embodiment, both the positive electrode tab group 21 and the negative electrode tab group 22 include the second bent portion 29. However, only one of the positive electrode tab group 21 and the negative electrode tab group 22 may include the second bent portion 29. Further, the way of bending the extending portions 28 at the second bent portion 29 may be different in each of the positive electrode tab group 21 and the negative electrode tab group 22. For example, in the positive electrode tab group 21 as shown in FIG. 6 and the negative electrode tab group 22 as shown in FIG. 7, the extending portions 28 may be curved or bent at the second bent portion 29.

In the positive electrode tab group 21 and the negative electrode tab group 22, the bending directions at the first bent portion may be different from each other. The bending directions at the second bent portion 29 may also be different from each other.

After jointing the tab group 21 or 22 with the corresponding conductive member 23 or 24, the tab group 21 or 22 is bent at the first bent portion 27. However, the order of the operations of the jointing and the bending may be reversed.

The conductive member 23 or 24 is located outside the extending portions 28. However, the conductive member 23 or 24 may be located between the electrode assembly 5 and the positive electrode tab 15(H2) or between the electrode assembly 5 and the negative electrode tab 19(H2), i.e., in the space S.

The positive electrode tab 15 is not limited to the positive electrode tab 15 with the entire region configured by the positive electrode non-application portion that is free from the positive electrode active material. The negative electrode tab 19 is not limited to the negative electrode tab 19 with the entire region configured by the negative electrode non-application portion, which is free from the negative electrode active material. That is, in the positive electrode tab 15 or the negative electrode tab 19, the active material may be partially applied. In each positive electrode tab 15 or each negative electrode tab 19, a region free from the active material is positioned at the edge portion of the tab 15 or 19.

The conductive member 23 or 24 is rectangular plate-like. However, the conductive member 23 or 24 may be formed in other shapes such as columnar (bar-like) or rectangular box-like.

The joint between the tab group 21 or 22 and the corresponding conductive member 23 or 24 may be made according to a joint method other than the resistance welding. For example, ultrasonic welding and soldering may be employed.

Three or more tab groups may be provided in the electrode assembly 5. In this case, the tab groups may be any one of the combination of a plurality of positive electrode tab groups 21 and a negative electrode tab group 22, the combination of a positive electrode tab group 21 and a plurality of negative electrode tab groups 22, and the combination of a plurality of positive electrode tab groups 21 and a plurality of negative electrode tab groups 22. The second bent portion 29 may be formed in all of the tab groups. Alternatively, the second bent portion 29 may be provided in one or more of the tab groups.

The present invention is not limited to the stacked type rechargeable battery 2 as disclosed in the above embodiment. The present invention may be applied to a winding type rechargeable battery in which band-like positive electrodes and negative electrodes are wound to form a stacked structure. Even in the winding type rechargeable battery, a separator may be located between each pair of the positive electrodes and the negative electrodes to insulate the positive electrodes from the negative electrodes. The present invention may be applied to the winding type rechargeable battery as long as the positive electrode tabs 15, the positive electrode tab group 21, the negative electrode tabs 19, and the negative electrode tab group 22 are provided.

The vehicle that mounts the rechargeable battery 2 according to the present embodiment may be an automobile or an industrial vehicle.

The rechargeable battery 2 corresponds to a rechargeable lithium-ion battery. However, the rechargeable battery 2 is not limited to this. Other rechargeable batteries may be employed. That is, any rechargeable battery may be employed as long as ions move between the positive electrode active material layer and the negative electrode active material layer and the electric charge is transferred.

The present invention may be embodied by electricity storage devices, such as an electric double layer capacitor.

The invention claimed is:

1. An electricity storage device, comprising:
one or more positive electrodes each having an edge portion and a tab on the edge portion;
one or more negative electrodes each having an edge portion and a tab on the edge portion;
an electrode assembly configured such that the positive electrodes and the negative electrodes are alternately stacked in a state in which the positive electrodes and the negative electrodes are insulated from each other;
an electrode terminal, which transfers electricity between the electrode terminal and the electrode assembly;
a conductive member, which electrically connects the electrode assembly and the electrode terminal;
tab groups each including tabs of the positive electrodes or tabs of the negative electrodes bundled in a stacking direction of the electrode assembly, wherein the tab groups are provided on an edge portion of the electrode assembly and connected to the conductive member; and
a case, which accommodates the conductive member and the electrode assembly, wherein
the tab groups each include a first bent portion, which is curved or bent, and an extending portion, which extends from the first bent portion in the stacking direction of the electrode assembly,
each extending portion includes a connecting portion electrically connected to the conductive member, and
the tab groups each include a second bent portion at which the tab group is curved or bent such that a distal end in the extending direction of the tab that is located at an outermost position of the first bent portion is positioned between the electrode assembly and the tab that is located at an innermost position of the first bent portion.

2. The electricity storage device according to claim 1, wherein each second bent portion and the case are insulated from each other.

3. The electricity storage device according to claim 1, wherein the distal end contacts an electrode having the same polarity and the tab that is located at the innermost position of the first bent portion.

4. The electricity storage device according to claim 1, wherein the second bent portion is curved or bent such that the second bent portion is substantially in parallel with the extending portion in a range from the first bent portion to the second bent portion.

5. The electricity storage device according to claim 1, wherein the second bent portion is curved or bent in the same direction as the bending direction of the first bent portion.

6. The electricity storage device according to claim 1, wherein the electricity storage device is a rechargeable battery.

* * * * *